United States Patent
Lee et al.

(10) Patent No.: US 9,209,465 B2
(45) Date of Patent: Dec. 8, 2015

(54) SEPARATOR FOR FUEL CELL AND FUEL CELL COMPRISING SAME

(71) Applicant: HANKOOK TIRE CO., LTD., Seoul (KR)

(72) Inventors: Kyung Hwa Lee, Daejeon (KR); Jae Wook Ihm, Daejeon (KR); Jeong Mu Heo, Daejeon (KR); Jeong Heon Kim, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 0 days.

(21) Appl. No.: 13/711,605

(22) Filed: Dec. 11, 2012

(65) Prior Publication Data
US 2013/0196252 A1 Aug. 1, 2013

(30) Foreign Application Priority Data
Dec. 15, 2011 (KR) .......................... 10-2011-0135466

(51) Int. Cl.
*H01M 8/02* (2006.01)
*H01M 8/00* (2006.01)
*H01M 8/10* (2006.01)

(52) U.S. Cl.
CPC .............. *H01M 8/0221* (2013.01); *H01M 8/00* (2013.01); *H01M 8/0213* (2013.01); *H01M 8/0215* (2013.01); *H01M 8/0226* (2013.01); *H01M 8/0228* (2013.01); *H01M 8/0247* (2013.01); *H01M 8/0276* (2013.01); *H01M 8/0282* (2013.01); *H01M 8/0284* (2013.01); *H01M 8/0286* (2013.01); *H01M 2008/1095* (2013.01); *Y02E 60/50* (2013.01)

(58) Field of Classification Search
CPC ............ H01M 8/0221; H01M 8/0223; H01M 8/0226; H01M 8/0228
USPC .......................................................... 429/509
See application file for complete search history.

(56) References Cited

U.S. PATENT DOCUMENTS

2004/0131918 A1* 7/2004 Ohara et al. .................... 429/38
2005/0048347 A1 3/2005 Takashita et al.

FOREIGN PATENT DOCUMENTS

| EP | 1416556 A | 5/2004 |
|---|---|---|
| EP | 1610405 A | 12/2005 |
| JP | 2002358982 A | 12/2002 |
| JP | 2005026076 A | 1/2005 |
| JP | 2008311108 A | 12/2008 |
| WO | 2009001739 A | 12/2008 |

OTHER PUBLICATIONS

European Search Report for EP12191378.4, mailed Mar. 11, 2013.

* cited by examiner

*Primary Examiner* — Nicholas P D'Aniello

(57) ABSTRACT

Disclosed are a separator for a fuel cell that improves power characteristics of the fuel cell, and a fuel cell including the same. The separator includes a plurality of current-carrying units, and an insulating unit interposed between the current-carrying units, wherein each current-carrying unit includes a first polymer matrix in which carbon-based particles are dispersed, and the insulating unit includes a second polymer matrix in which insulating inorganic particles are dispersed. The separator for fuel cells includes an insulating unit that exhibits low gas permeability and superior electrical insulation property, and the current-carrying unit that exhibits superior strength characteristics and conductivity, thus increasing voltage generated per one cell and considerably increasing a power generated per a constant area, when applied to the fuel cells.

16 Claims, 3 Drawing Sheets

SEPARATOR FOR FUEL CELL AND FUEL CELL COMPRISING SAME

CROSS-REFERENCE TO RELATED APPLICATION

This application claims priority under 35 U.S.C. §119 to Korean Patent Application No. 10-2011-0135466 filed on Dec. 15, 2011, the disclosure of which is hereby incorporated by reference in its entirety.

BACKGROUND OF THE INVENTION

1. Field of the Invention

The present invention relates to a separator for a fuel cell that improves power characteristics of the fuel cell, and a fuel cell comprising the same.

2. Description of the Related Art

As importance of alternative energies emerges in response to the exhaustion of energy resources, fuel cells are attracting considerable attention as a next regeneration energy source. In particular, fuel cells are actively researched owing to advantages of high efficiency and eco-friendliness.

A stack, which is an essential component of a fuel cell system, is an assembly of laminated unit cells, and each unit cell includes a membrane electrode assembly (MEA) and a separator (bipolar plate).

Separators are the most commonly used for manufacture of stacks. Depending on separator shape, structures of the stack are determined The separator performs various functions, for example, supplies hydrogen and oxygen to a cathode, prevents mixing of the supplied gas, moves electrons generated during reactions in electrodes, and discharges water generated in the cathode to the outside. Accordingly, the separator should have superior conductivity, facilitating movement of electrons, and should have surface characteristics, enabling produced water to be efficiently discharged. Also, in order to prevent mixing of gas supplied to the cathode, gas permeability is also important and other properties such as corrosion resistance and strength depending on driving environments and operation conditions of fuel cells are also required.

Developed and commonly used materials for fuel cell separators are graphite, a composite of graphite and a resin, or metals such as stainless steel or aluminum.

A voltage generated by electrode reaction in one cell manufactured using such a separator is constant, independent of a material or area of the separator, but current is proportional to a reaction area with a catalyst. Accordingly, power of a fuel cell depends on separator area. Accordingly, in order to increase power, an increase in fuel cell separator area is necessary. However, the increase in fuel cell separator area disadvantageously complicates molding and processing and causes an increase in cost due to increased manufacturing equipment area.

RELATED ART

Patent Document (Patent Document 1) Korean Patent No. 0615105 (registered on Aug. 16, 2006)

(Patent Document 2) Korean Patent No. 0834607 (registered on May 27, 2008)

SUMMARY OF THE INVENTION

It is one aspect of the present invention to provide a separator for a fuel cell and a method for manufacturing the same to improve power characteristics of the fuel cell.

It is another aspect of the present invention to provide a fuel cell including the separator.

In accordance with one aspect of the present invention, provided is a separator for a fuel cell including: a plurality of current-carrying units; and an insulating unit interposed between the current-carrying units, wherein each current-carrying unit includes a first polymer matrix in which carbon-based particles are dispersed, and the insulating unit includes a second polymer matrix in which insulating inorganic particles are dispersed.

The insulating inorganic particles may be selected from the group consisting of aluminum oxide, magnesium oxide, calcium oxide, titanium dioxide, barium titanate, silica, mica, talc, kaolin, a glass powder, calcium carbonate, quartz and a mixture thereof.

The insulating inorganic particles may have a mean particle diameter of 1 to 100 µm.

The insulating inorganic particles may be present in an amount of 10 to 1,000 parts by weight, with respect to 100 parts by weight of the second polymer.

The carbon-based particles may be selected from the group consisting of a carbon powder, graphite, carbon black, acetylene black, Ketjen black, Denka black, activated carbon, carbon nanotubes, carbon nanofibers, carbon nanowires, carbon nanohorns, carbon nanorings and a mixture thereof.

The carbon-based particles may have a mean particle diameter of 1 to 200 µm.

The carbon-based particles may be present in an amount of 10 to 1,000 parts by weight, with respect to 100 parts by weight of the first polymer.

The first and second polymer matrixes may contain a thermosetting resin.

The first and second polymer matrixes may be selected from the group consisting of an epoxy resin, a melamine resin, a urea resin, a unsaturated polyester resin, an alkyd resin, a silicone resin, a phenol resin, a polyurethane resin and a polyimide resin.

The separator may include the current-carrying unit and the insulating unit at a weight ratio of 36:1 to 7:3.

In another aspect of the present invention, provided is a method for manufacturing a separator for a fuel cell including: separately preparing an insulating unit-forming composition containing a thermosetting resin, insulating inorganic particles, a curing agent and a curing accelerator, and a current-carrying unit-forming composition containing a thermosetting resin, carbon-based particles, a curing agent and a curing accelerator; and simultaneously compression-molding the insulating unit-forming composition and the current-carrying unit-forming composition.

In the insulating unit-forming composition, the thermosetting resin and the curing agent may be solid particles.

The preparation of the insulating unit-forming composition may include: mixing a thermosetting resin, a curing agent and a curing accelerator to prepare a mixture; and grinding the mixture and then mixing the ground mixture with insulating inorganic particles.

In the insulating unit-forming composition, the insulating inorganic particles may be present in an amount of 10 to 1,000 parts by weight, with respect to 100 parts by weight of the thermosetting resin.

In the insulating unit-forming composition, the curing agent may be present in an amount of 30 to 70 parts by weight, with respect to 100 parts by weight of the thermosetting resin.

In the insulating unit-forming composition, the curing accelerator may be present in an amount of 0.5 to 8 parts by weight, with respect to 100 parts by weight of the thermosetting resin.

In accordance with another aspect of the present invention, provided is a fuel cell including the separator.

Details of embodiments of the present invention are included in the following description of the invention.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF THE INVENTION

Hereinafter, embodiments of the present invention will be described in detail. However, these embodiments are only provided to illustrate the present invention and should not be construed as limiting the present invention. The present invention is defined by only the scope of claims described below.

The present invention is characterized in that a part of a separator for fuel cells is molded and manufactured using a composite of an insulating material and a resin, to increase a voltage generated from one cell and thereby increase a power of the fuel cell generated per a constant area.

That is, the separator for fuel cells according to one embodiment of the present invention includes a plurality of current-carrying units and an insulating unit interposed between the current-carrying units. The current-carrying unit contains a first polymer matrix in which carbon-based particles are disposed, and the insulating unit contains a second polymer matrix in which insulating inorganic particles are dispersed.

Figure 1:
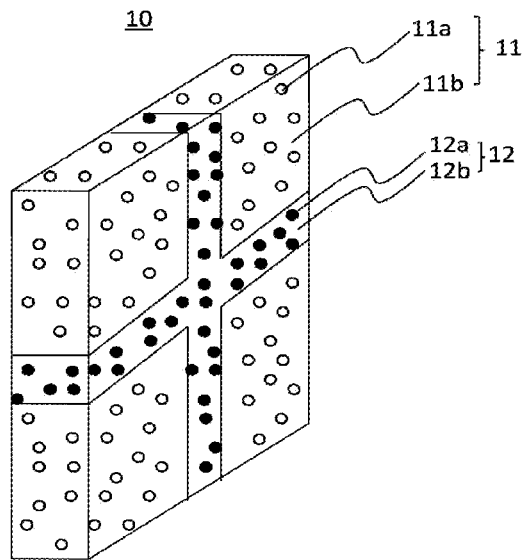
FIG. 1 is a view illustrating a configuration of a separator for fuel cells according to one embodiment of the present invention.

FIG. 1 is a view illustrating a configuration of a separator for fuel cells according to one embodiment of the present invention. FIG. 1 is provided only as an example for description of the present invention and the present invention is not limited to the configuration of FIG. 1.

Hereinafter, referring to FIG. 1, the separator for fuel cells 10 includes a plurality of current-carrying units 11, and an insulating unit 12 interposed between the current-carrying units.

The insulating unit 12 includes a second polymer matrix 12b formed by cross-linkage of a thermosetting resin and insulating inorganic particles 12a dispersed in the second polymer matrix 12b.

The second polymer constituting the second polymer matrix functions to form a polymer matrix and serves as a binder. The second polymer may be a thermosetting resin, and specifically, the thermosetting resin is selected from the group consisting of an epoxy resin, a melamine resin, a urea resin, an unsaturated polyester resin, an alkyd resin, a silicone resin, a phenol resin, a polyurethane resin and a polyimide resin.

Preferably, the insulating inorganic particles 12a are selected in consideration of physical properties such as insulation property, corrosion resistance, gas permeability and moldability, strength and adhesion with neighboring portions. The insulating inorganic particles 12a that can be used in the present invention are selected from the group consisting of metal oxides such as aluminum oxide ($Al_2O_3$), magnesium oxide, calcium oxide, titanium dioxide or barium titanate; inorganic particles such as silica, mica, talc, kaolin, glass powder, calcium carbonate ($CaCO_3$) or quartz; and mixtures thereof.

Also, the particle size of the insulating inorganic particles 12a may be suitably controlled according to application and characteristics. Specifically, the insulating inorganic particles preferably have a mean particle diameter of 1 to 100 μm, more preferably, 25 to 75 μm.

Preferably, the insulating inorganic particles 12a are present in an amount of 10 to 1,000 parts by weight, with respect to 100 parts by weight of the second polymer. When the content of the insulating inorganic particles is lower than 10 parts by weight, disadvantageously, molding is not easy, and when the content of the insulating inorganic particles exceeds 1,000 parts by weight, gas permeability may be disadvantageously deteriorated. More preferably, the insulating inorganic particles are present in an amount of 100 to 500 parts by weight.

The current-carrying unit 11 includes a first polymer matrix 11b formed by cross-linkage of a thermosetting resin, and carbon-based particles 11a dispersed in the first polymer matrix 11b. Also, a flow channel (not shown) is formed on the surface where the current-carrying unit 11 contacts the membrane-electrode assembly.

The first polymer constituting the first polymer matrix 11b may be a thermosetting resin and the thermosetting resin is described as above.

The carbon-based particles 11a are selected from the group consisting of a carbon powder, graphite, carbon black, acetylene black, Ketjen black, Denka black, Super P, activated carbon, carbon nanotubes, carbon nanofibers, carbon nanowires, carbon nanohorns, carbon nanorings and a mixture thereof.

Also, the carbon-based particles 11a preferably have a mean particle diameter of 1 to 200 μm. When the particle size of carbon-based particles exceeds 200 μm, molding and sealing are disadvantageous. More preferably, the carbon-based particles 11a have a particle diameter of 1 to 100 μm.

Also, preferably, the carbon-based particles 11a are present in an amount of 10 to 1000 parts by weight, with respect to 100 parts by weight of the first polymer. When the content of the carbon-based particles is lower than 10 parts by weight, disadvantageously, molding is not easy, and when the content of the carbon-based particles exceeds 1,000 parts by weight, disadvantageously, gas permeability may be deteriorated. More preferably, the carbon-based particles are present in an amount of 100 to 500 parts by weight.

FIG. 1 illustrates a separator having a configuration in which an insulating unit 12 is disposed in the form of a cross between four current-carrying units 11, but the number of the current-carrying units 11 and the shape of the insulating unit 12 are not particularly limited.

Specifically, the separator according to the present invention may include two or more current-carrying units in consideration of the size of the fuel cell or the like. Also, the insulating unit may be interposed in the form of a film between the current-carrying units, and may have various channel shapes such as a cross shape or an octothorpe (#) shape.

Figure 2:
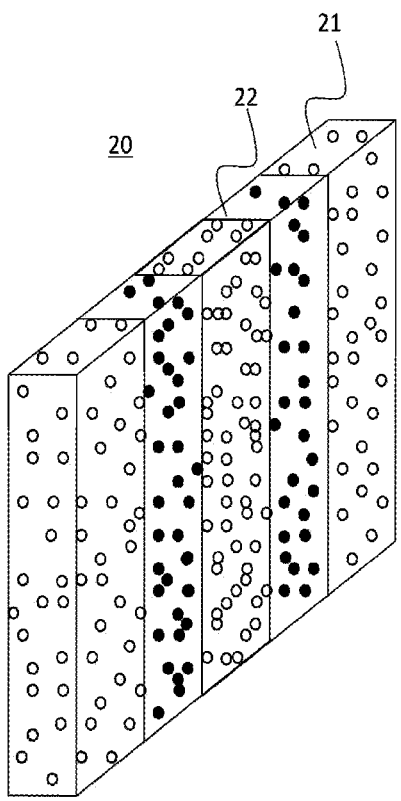
FIG. 2 is a view illustrating a configuration of a separator for fuel cells according to another embodiment of the present invention.
Figure 3:
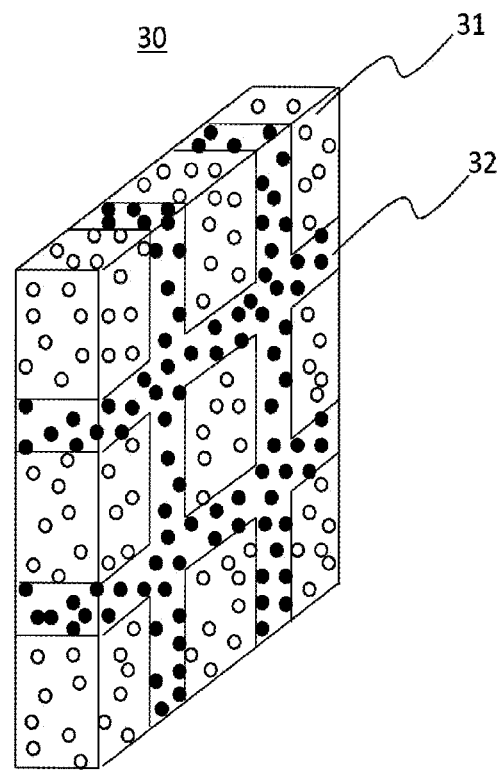
FIG. 3 is a view illustrating a configuration of a separator for fuel cells according to another embodiment of the present invention.

FIGS. 2 and 3 are schematic views illustrating a separator for fuel cells according to one embodiment of the present invention. The separator for fuel cells 20 according to the present invention may have a structure in which two insulating units 22 having a film shape are interposed between three current-carrying units 21, as shown in FIG. 2, or have a structure in which insulating units 22 are interposed in the form of an octothorpe between nine current-carrying units 31, as shown in FIG. 3.

In the separator according to the present invention, as an area of the current-carrying unit increases, a reaction area with a catalyst increases and a power of the fuel cell is thus increased. On the other hand, as an area of the current-carrying unit becomes excessively large and an area of the insulating unit becomes excessively small, an insulating effect may not be obtained due to molding difficulty. Accordingly, preferably, the current-carrying unit and the insulating unit are present at a weight ratio of 36:1 to 7:3. When the content ratio of the current-carrying unit and the insulating unit is out of the range defined above and the content ratio of the current-carrying unit to the insulating unit is excessively high, disadvantageously, a current-carrying area decreases. When the content of the current-carrying unit to the insulating unit is excessively low, the effect of the insulating unit may not be obtained.

The separator for fuel cells having a configuration above may be manufactured by a method for manufacturing a separator for fuel cells including: preparing an insulating unit-forming composition containing a thermosetting resin, insulating inorganic particles, a curing agent and a curing accelerator, and preparing a current-carrying unit-forming composition containing a thermosetting resin, carbon-based particles, a curing agent and a curing accelerator; and simultaneously compression molding the insulating unit-forming composition and the current-carrying unit-forming composition.

Hereinafter, the method will be described in detail in respective steps. First, an insulating unit-forming composition containing a thermosetting resin, insulating inorganic particles, a curing agent and a curing accelerator, and a current-carrying unit-forming composition containing a thermosetting resin, carbon-based particles, a curing agent and a curing accelerator were separately prepared.

The insulating unit-forming composition is prepared by mixing a mixture of the thermosetting resin, the curing agent and the curing accelerator with insulating inorganic particles.

The mixing process may be carried out by a common mixing method such as dry mixing or wet (liquid) mixing and dry mixing is preferably carried out in consideration of process easiness. Accordingly, the thermosetting resin and the curing agent are preferably solid phase.

Also, before mixing the mixture with the insulating inorganic particles, the method may further optionally include grinding the mixture of the thermosetting resin, the curing agent and the curing accelerator The grinding process makes the particle size of the thermosetting resin and the curing agent substantially equivalent to the particle size of the insulating inorganic particles, thus enabling more homogeneous mixing and inducing rapid curing reaction during molding.

The kinds and contents of thermosetting resin and insulating inorganic particles used for preparation of the insulating unit-forming composition have been described as above.

Any curing agent may be used without particular limitation as long as it is commonly used for curing a thermosetting resin. Specifically, examples of curing agents include amine compounds, diamine compounds, polyamine compounds, polyamide compounds, phenol resins and the like.

Preferably, the curing agent is present in an amount of 30 to 70 parts by weight, with respect to 100 parts by weight of the thermosetting resin for forming the insulating unit. When the content of the curing agent is lower than 30 parts by weight, disadvantageously, unreacted thermosetting resin may be produced. When the content of the curing agent exceeds 70 parts by weight, disadvantageously, a part of the curing agent may not be reacted.

The curing accelerator functions to reduce curing time of the resin and specific examples thereof include basic compounds such as triphenylphosphine (TPP) diaminodiphenylsulfone (DDS), tertiary amines, or imidazole.

The curing accelerator is present in an amount of 0.5 to 8 parts by weight, with respect to 100 parts by weight of the thermosetting resin for forming the insulating unit. When the content of the curing accelerator is lower than 0.5 parts by weight, handling is easy due to long tack free time, but molding time is disadvantageously lengthened due to low curing speed. When the content of the curing accelerator exceeds 8 parts by weight, curing speed is increased due to short tack free time, thus disadvantageously making molding difficult.

Separately from the insulating unit-forming composition, a thermosetting resin, carbon-based particles, a curing agent and a curing accelerator are mixed to prepare a current-carrying unit-forming composition.

As in preparation of the insulating unit-forming composition, this mixing process may be carried out by mixing a thermosetting resin, a curing agent and a curing accelerator and then mixing the resulting mixture with carbon-based particles. The mixing process may be carried out by dry or wet (liquid) mixing and wet mixing may be carried out using a solvent such as acetone.

Also, before mixing with the carbon-based particles, in order to make a particle size of the thermosetting resin and the curing agent equivalent to that of the carbon-based particles, optionally, the mixture of the thermosetting resin, the curing agent and the curing accelerator may be further subjected to a grinding process.

The kinds and contents of the thermosetting resin and carbon-based particles have been described above, and specific kinds and contents of the curing agent and curing accelerator have been described as in the preparation of the insulating unit-forming composition.

The insulating unit-forming composition and the current-carrying unit-forming composition may further contain an additive to improve functions of the separator for fuel cells, or ease of manufacture.

Then, the prepared insulating unit-forming composition and the current-carrying unit-forming composition are simultaneously subjected to compression molding in a compression molding machine to manufacture a separator for fuel cells.

The compression molding process may be carried out by a common method and is preferably carried out at a temperature of 130 to 170° C. and at a pressure of 10 to 200 kg/cm$^2$.

When the temperature and pressure during compression molding are out of the ranges defined above, moldability and curability are disadvantageously poor.

Also, as a result of the compression molding, flow channels are simultaneously formed in the separator for fuel cells.

The separator for fuel cells manufactured by the method includes an insulating unit that exhibits low gas permeability and superior electrical insulation property, and the current-carrying unit that exhibits superior strength characteristics and conductivity, thus increasing voltage generated per one cell and considerably increasing a power generated per a constant area, when applied to the fuel cells.

Accordingly, in accordance with another aspect of the present invention, provided is a fuel cell including the separator.

More specifically, the fuel cell includes a stack to generate electricity through electrochemical reaction between a fuel and an oxidizing agent, a fuel supplier to supply the fuel to an electricity generator, and an oxidizing agent supplier to supply the oxidizing agent to the electricity generator, wherein the stack includes at least one unit cell including: a membrane-electrode assembly including an anode and a cathode facing each other, and a polymer electrolyte membrane interposed between the anode and cathode; and a separator disposed on both surfaces of the membrane-electrode assembly.

The respective components of the fuel cell have a configuration of a general fuel cell and a detailed description thereof is thus omitted.

Hereinafter, embodiments will be described in detail to an extent that the embodiments may be easily executed by a person having common knowledge in the art to which the present invention pertains. However, the present invention may be implemented as a variety of different modifications and is not limited to embodiments described herein.

PREPARATION EXAMPLE

Preparation of Separator for Fuel Cell

Example 1

60 parts by weight of a phenol resin as a curing agent and 3 parts by weight of TPP as a curing accelerator, with respect to 100 parts by weight of solid particles of an epoxy region as a thermosetting resin, were dry-mixed in a mixer and were ground to a particle size of 50 μm or more using a grinder. The resulting ground mixture was dry-mixed with 400 parts by weight of $Al_2O_3$ having a mean particle size of 50 μm, as insulating inorganic particles, to prepare an insulating unit-forming composition.

Separately, 60 parts by weight of a phenol resin as a curing agent, 3 parts by weight of TPP as a curing accelerator and 200 parts by weight of acetone as a solvent, with respect to 100 parts by weight of solid particles of an epoxy region as a thermosetting resin, were stirred using a stirrer and were then mixed with 500 parts by weight of graphite having a particle size of 20 to 100 μm, as carbon-based particles, using a kneader, followed by drying, to prepare a current-carrying unit-forming composition.

25 parts by weight of the insulating unit-forming composition and 75 parts by weight of the current-carrying unit-forming composition thus prepared were simultaneously compression molded using a molding machine at a temperature of 150° C., to manufacture a separator for fuel cells having a thickness of 0.5 to 3 mm, in which an insulating unit is interposed in the form of a film between two current-carrying units.

Example 2 and 3

Separators for fuel cells were manufactured in the same manner as in Example 1, except that a silica sand and glass powder were used as insulating inorganic particles, instead of $Al_2O_3$, respectively.

Comparative Example 1

60 parts by weight of a phenol resin as a curing agent, 3 parts by weight of TPP as a curing accelerator and 200 parts by weight of acetone as a solvent, with respect to 100 parts by weight of solid particles of an epoxy resin as a thermosetting resin, were stirred in a stirrer and were then mixed with 500 parts by weight of graphite having a mean particle size of 20 to 100 μm as carbon-based particles, followed by drying, and the resulting mixture was compression-molded at a temperature of 150° C. to manufacture a separator for a fuel cell having a thickness of 0.5 to 3 mm.

Experimental Example 1

Evaluation of Physical Properties of Separator for Fuel Cell

Figure 4:
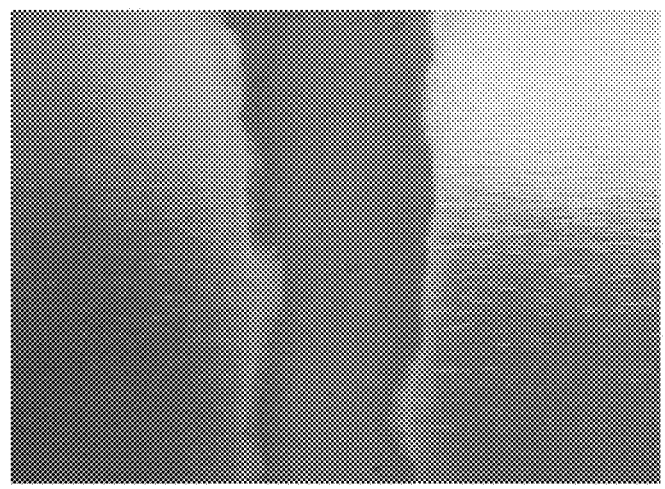
FIG. 4 is an image showing a part of the surface of the separator for fuel cells in Example 1.

The surface of the separator for fuel cells manufactured in Example 1 was measured and the results are shown in FIG. 4.

As shown in FIG. 4, the insulating unit containing insulating inorganic particles was disposed in the form of a film between current-carrying units containing a conductive carbon material.

The electrical conductivity and flexural strength of the separators for fuel cells manufactured in Examples 1 to 3 and Comparative Example 1 were measured.

Regarding electrical conductivity, mean electrical conductivity was evaluated from resistances measured using a 4 point probe and flexural strength was measured in accordance with ASTM D790. The results are shown in FIGS. 5 and 6.

Figure 5:
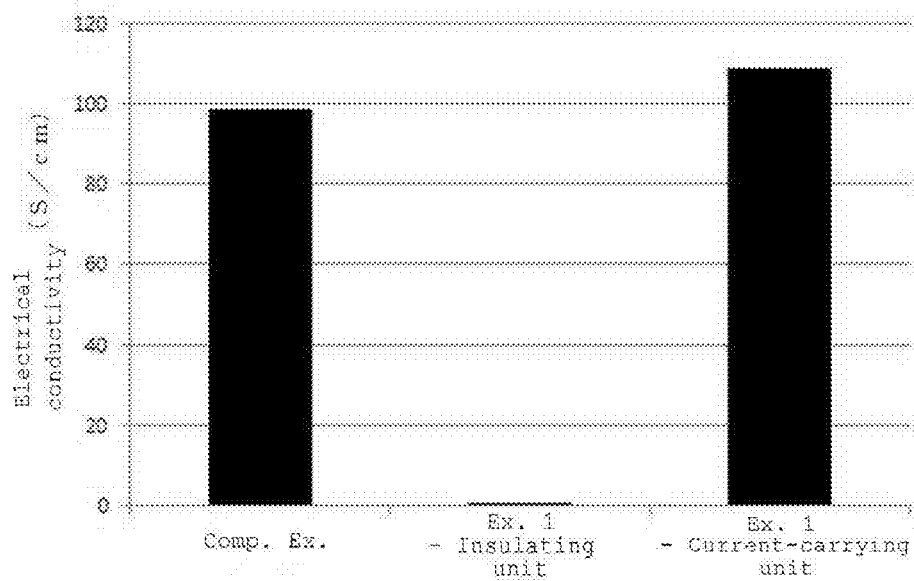
FIG. 5 is a graph showing a measurement result of electrical conductivity of separator for fuel cells manufactured in Example 1.
Figure 6:
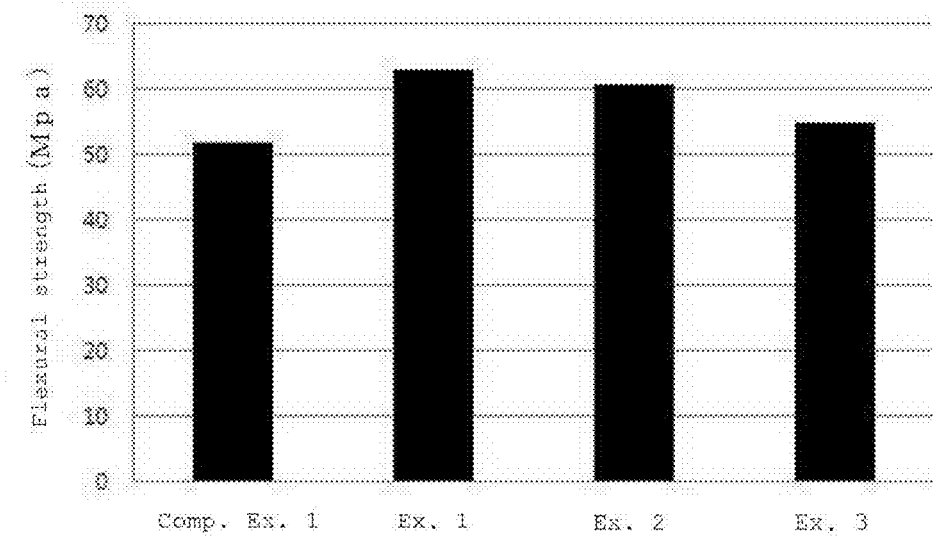
FIG. 6 is a graph showing a measurement result of flexural strength of separators for fuel cells manufactured in Examples 1 to 3.

FIG. 5 is a graph showing electrical conductivity of the separator for fuel cells manufactured in Example 1. FIG. 6 is a graph showing flexural strength of the separator for fuel cells manufactured in Examples 1 to 3.

As shown in FIG. 5, it can be seen from the test and measurement results of electrical conductivity of the separator for fuel cells manufactured in Example 1 that electricity did not flow to the insulating unit disposed in the center of the separator, and electrical conductivity of the current-carrying unit excluding the insulating unit was substantially equivalent to that of the separator of Comparative Example 1. Also, as shown in FIG. 6, separators of Example 1 to 3 manufactured using different kinds of insulating inorganic particles exhibited similar or superior flexural strength, as compared to the separator of Comparative Example 1.

Experimental Example 2

Evaluation of Fuel Cell Functions

The separators manufactured in Examples 1 to 3 and Comparative Example 1 were laminated to manufacture a stack and power characteristics of the stack thus obtained were evaluated.

A membrane-electrode assembly produced by GORE Inc. was used for the stack, and separators manufactured in Examples 1 to 3 and Comparative Example 1 were disposed at and coupled to both sides of the membrane-electrode assembly to manufacture the stack. The manufactured stack was mounted on a fuel cell function tester (produced by Hydrogenic Corp.), hydrogen and air were supplied to an anode and a cathode, respectively, at 60 to 80° C., and functions of the fuel cell were measured.

As a result, the stacks including separators of Examples 1 to 3 exhibited a 1.04×increase in mean power, as compared to the stack including the separator of Comparative Example 1.

From this test result, it can be seen that although the separators of Examples 1 to 3 according to the present invention include an insulating unit, they can improve power characteristics when applied to fuel cells.

As apparent from the fore-going, the separator for fuel cells includes an insulating unit that exhibits low gas permeability and superior electrical insulation property, and the current-carrying unit that exhibits superior strength characteristics and conductivity, thus increasing voltage generated per one cell and considerably increasing a power generated per a constant area, when applied to the fuel cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A separator for a fuel cell comprising:
   a plurality of current-carrying units penetrating between a front side and a back side of the separator; and
   a plurality of insulating units separating the current-carrying units, crossing each other, and penetrating between the front side and the back side of the separator,
   wherein each current-carrying unit comprises a first polymer matrix in which carbon-based particles are dispersed, and
   wherein each insulating unit comprises a second polymer matrix in which insulating inorganic particles are dispersed, and
   wherein the first polymer matrix and the second polymer matrix comprise epoxy resins in an amount of 100 parts by weight and phenol resins in an amount of 30 to 70 parts by weight.

2. The separator according to claim 1, wherein the insulating inorganic particles are selected from the group consisting of aluminum oxide, magnesium oxide, calcium oxide, titanium dioxide, barium titanate, silica, mica, talc, kaolin, a glass powder, calcium carbonate, quartz and a mixture thereof.

3. The separator according to claim 1, wherein the insulating inorganic particles have a mean particle diameter of 1 to 100 μm.

4. The separator according to claim 1, wherein the insulating inorganic particles are present in an amount of 10 to 1,000 parts by weight, with respect to 100 parts by weight of the second polymer.

5. The separator according to claim 1, wherein the carbon-based particles are selected from the group consisting of a carbon powder, graphite, carbon black, acetylene black, Ketjen black, Denka black, activated carbon, carbon nanotubes, carbon nanofibers, carbon nanowires, carbon nanohorns, carbon nanorings and a mixture thereof.

6. The separator according to claim 1, wherein the carbon-based particles have a mean particle diameter of 1 to 200 μm.

7. The separator according to claim 1, wherein the carbon-based particles are present in an amount of 10 to 1,000 parts by weight, with respect to 100 parts by weight of the first polymer.

8. A fuel cell comprising the separator according to claim 1.

9. A fuel cell comprising the separator according to claim 2.

10. A fuel cell comprising the separator according to claim 3.

11. A fuel cell comprising the separator according to claim 4.

12. A fuel cell separator comprising:
    a plurality of current-carrying units penetrating between a front side and a back side of the separator; and
    a plurality of insulating units separating the current-carrying units, the insulating units having a cross shape and penetrating between the front side and back side of the separator,
    wherein each current-carrying unit comprises a first polymer matrix in which carbon-based particles are dispersed, and
    each insulating unit comprises a second polymer matrix in which insulating inorganic particles are dispersed,
    wherein the first polymer matrix and the second polymer matrix comprise epoxy resins in an amount of 100 parts by weight and phenol resins in an amount of 30 to 70 parts by weight.

13. The fuel cell separator of claim 12, wherein the separator comprises the current-carrying unit and the insulating unit at a weight ratio of 36:1 to 7:3.

14. The fuel cell separator of claim 12, wherein the insulating unit and the plurality of current-carrying units collectively form a single separator plate.

15. The separator according to claim 1, wherein the separator comprises the current-carrying unit and the insulating unit at a weight ratio of 36:1 to 7:3.

16. The separator according to claim 1, wherein the current-carrying unit are disposed at four corners of the separator and a total area occupied by the current-carry units in the separator is greater than a total area occupied by the insulating units.

* * * * *